(12) United States Patent  Sinha

(10) Patent No.: US 12,452,054 B2
(45) Date of Patent: Oct. 21, 2025

(54) RENEWAL OF A SIGNED ATTESTATION ARTIFACT WITH LIMITED USAGE OF A TRUSTED PLATFORM MODULE

(71) Applicant: Microsoft Technology Licensing, LLC, Redmond, WA (US)

(72) Inventor: Saurav Sinha, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 18/415,600

(22) Filed: Jan. 17, 2024

(65) Prior Publication Data

US 2025/0233740 A1    Jul. 17, 2025

(51) Int. Cl.
*H04L 9/32* (2006.01)
*H04L 9/08* (2006.01)

(52) U.S. Cl.
CPC ............ *H04L 9/088* (2013.01); *H04L 9/3213* (2013.01)

(58) Field of Classification Search
USPC ......................................................... 380/277
See application file for complete search history.

(56) References Cited

U.S. PATENT DOCUMENTS

| | | | |
|---|---|---|---|
| 2009/0012987 A1* | 1/2009 | Kaminsky ........... | G06F 21/6218 707/999.102 |
| 2017/0149568 A1* | 5/2017 | LaGrone ............. | G06F 12/1408 |
| 2020/0259669 A1* | 8/2020 | Nelluri .................... | G06F 16/22 |
| 2023/0353381 A1* | 11/2023 | Bhamidipati ......... | H04L 9/3213 |
| 2024/0362317 A1* | 10/2024 | Kelly ..................... | G06F 21/57 |

* cited by examiner

*Primary Examiner* — Sanchit K Sarker
(74) *Attorney, Agent, or Firm* — Wade IP Law PLLC

(57) ABSTRACT

Techniques are described herein that are capable of renewing a signed attestation artifact with limited usage of a trusted platform module (TPM). Based on initiation of a cold boot of a host, attestation artifacts are received from the host. The attestation artifacts prove trust in a trusted execution environment (TEE) that runs on the host. The attestation artifacts include a public portion of an ephemeral cryptographic key (ECKeyPub), a public portion of a signing key (SKeyPub), and a signed key claim. The attestation artifacts are validated, and a signed attestation artifact, which includes the ECKeyPub and the SKeyPub, is generated and provided to the host. Based on a request to renew the signed attestation artifact including the signed attestation artifact, which includes the ECKeyPub and the SKeyPub, and further based on the TEE possessing the ephemeral cryptographic key, the signed attestation artifact is renewed during the cold boot session.

22 Claims, 8 Drawing Sheets

RENEWAL OF A SIGNED ATTESTATION ARTIFACT WITH LIMITED USAGE OF A TRUSTED PLATFORM MODULE

BACKGROUND

Attestation is a process of validating integrity (a.k.a. health) of a computing system (e.g., hardware and/or software therein). For instance, when a first computing system (e.g., computing device) attempts to interact with (e.g., access) a second computing system (e.g., host), the first computing system may require proof that the second computing system is not running malicious software in order to trust information received from the second computing system. Such proof typically is provided in the form of a device health certificate (e.g., an identity certificate) that is issued by an attestation service. The attestation service traditionally queries the second computing system for information about a state of the second computing system and checks the information for indications of malicious software.

Conventional attestation techniques use a trusted platform module (TPM) in a computing system to attest to health of the computing system each time attestation is requested. For instance, an attestation service traditionally compares the information received from the computing system to trusted information, which is stored in the TPM, in response to each attestation request. A difference between the information and the trusted information provides an indication of malicious software. If no indications of malicious software are found, the attestation service may issue the device health certificate.

TPMs frequently become unresponsive, which traditionally renders an attestation service incapable of attesting to the health of the computing systems that include the TPMs. A TPM of a computing system typically is initially responsive when a cold boot of the computing system is initiated, which may enable the attestation service to issue a device health certificate that attests to the health of the computing system. However, if the TPM becomes unresponsive, the attestation service traditionally is unable to renew the device health certificate during the remainder of the cold boot session, and the TPM often enters lockout mode until a next cold boot of the computing system.

SUMMARY

It may be desirable to renew a signed attestation artifact (e.g., a device health certificate), which attests to health of a computing system, without using a trusted platform module (TPM) that is included in the computing system. An attestation artifact is an artifact (e.g., a cryptographic key or a measurement) that is capable of being used to establish (e.g., prove) trust in health of a computing system. Health of a computing system indicates whether a configuration (e.g., a measured configuration) of the computing system corresponds to a reference configuration (e.g., an expected configuration) of the computing system. For instance, the health of the computing system may indicate an extent to which the configuration of the computing system corresponds to (e.g., matches) the reference configuration. The configuration of the computing system may include a hardware configuration of the computing system, a software configuration of the computing system, and/or a firmware configuration of the configuration system. A TPM is a microcontroller designed to assure integrity (e.g., expected behavior) of a computing system by integrating attestation artifacts, such as cryptographic keys and unforgeable measurements, into the computing system. Such attestation artifacts may be used to establish a "chain of trust" under which each component of hardware and software of the computing system may be validated (e.g., certified). In an example implementation, the TPM is configured to operate in accordance with the TPM technical specification written by a computer industry consortium called Trusted Computing Group (TCG). In another example implementation, the TPM is implemented as a semiconductor chip that has a randomly created, static endorsement key associated with the chip. The endorsement key has a public portion (a.k.a. a public key) and a private portion (a.k.a. a private key). The private portion does not leave the chip, whereas the public portion is publicly available for attestation and other purposes. An attestation service may verify the health of the computing system for the purpose of renewing the signed attestation artifact by utilizing attestation artifact(s) that are received from the computing system, rather than accessing the TPM to obtain such attestation artifact(s).

In an example implementation, the attestation service validates attestation artifacts that are received from the computing system when a cold boot of the computing system is initiated and inserts at least a subset (e.g., one or more) of the attestation artifacts into the signed attestation artifact that is issued to the computing system by the attestation service. A cold boot of a computing system is a process in which a power source is connected to the computing system. Accordingly, initiation of the cold boot includes connecting the power source to the computing system. If the power source is already connected to the computing system, initiation of the cold boot includes disconnecting the power source from the computing system and then reconnecting the power source to the computing system. A time instance at which the cold boot of the computing system is initiated defines a start of a cold boot session of the computing system. The cold boot session ends at a time instance at which the power source is disconnected from the computing system.

A request to renew the signed attestation artifact, which is received by the attestation service from the computing system, may include the subset of the attestation artifacts that was inserted into the signed attestation artifact when the cold boot of the computing system was initiated. For instance, the request to renew the signed attestation artifact may include the signed attestation artifact, which includes the subset of the attestation artifacts. The attestation service uses the subset of the attestation artifacts (and potentially one or more other attestation artifacts, which may be included in the request to renew the signed attestation artifact) to verify the health of the computing system without a need to interact with the TPM. In this manner, the attestation service is capable of renewing the signed attestation artifact even if the TPM has become unresponsive during the cold boot session.

Various approaches are described herein for, among other things, renewing a signed attestation artifact, which attests to health of a computing system, with limited usage of a TPM that is included in the computing system. In the example approaches described herein, the computing system is referred to as a host for non-limiting, illustrative purposes. For example, the computing system may host a trusted execution environment (TEE) and/or an instance of a cloud computing service, though the example approaches are not limited in this respect. In accordance with this example, the TEE may be used to facilitate renewal of the signed attestation artifact. In further accordance with this example, the renewal of the signed attestation artifact may be a prerequisite for providing continued access to the instance of the cloud computing service that is hosted by the computing system.

In an example approach, based at least on (e.g., in response to or as a result of) initiation of a cold boot of a host, attestation artifacts are received from the host. At least a portion of the artifacts is gathered from a TPM in the host. The attestation artifacts prove trust in a TEE that runs on the host. A time instance at which the cold boot of the host is initiated defines a start of a cold boot session. The attestation artifacts include a public portion of an ephemeral cryptographic key, a public portion of a signing key, and a key claim. The ephemeral cryptographic key is generated by the TEE. The ephemeral cryptographic key is configured to expire at a time at which the cold boot session ends. The signing key is owned by the TEE. The key claim indicates that the ephemeral cryptographic key is generated by the TEE. The key claim is signed by a private portion of the signing key. The attestation artifacts are validated. Based at least on the attestation artifacts being validated, a signed attestation artifact (e.g., a device health certificate), which comprises the public portion of the ephemeral cryptographic key and the public portion of the signing key, is generated. The signed attestation artifact, which comprises the public portion of the ephemeral cryptographic key and the public portion of the signing key, is provided to the host. The signed attestation artifact attests to health of the host. A request to renew the signed attestation artifact is received during the cold boot session. The request includes the signed attestation artifact, which comprises the public portion of the ephemeral cryptographic key and the public portion of the signing key. Based at least on the request including the signed attestation artifact, which comprises the public portion of the ephemeral cryptographic key and the public portion of the signing key and further based at least on the TEE possessing the ephemeral cryptographic key, the signed attestation artifact is renewed during the cold boot session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
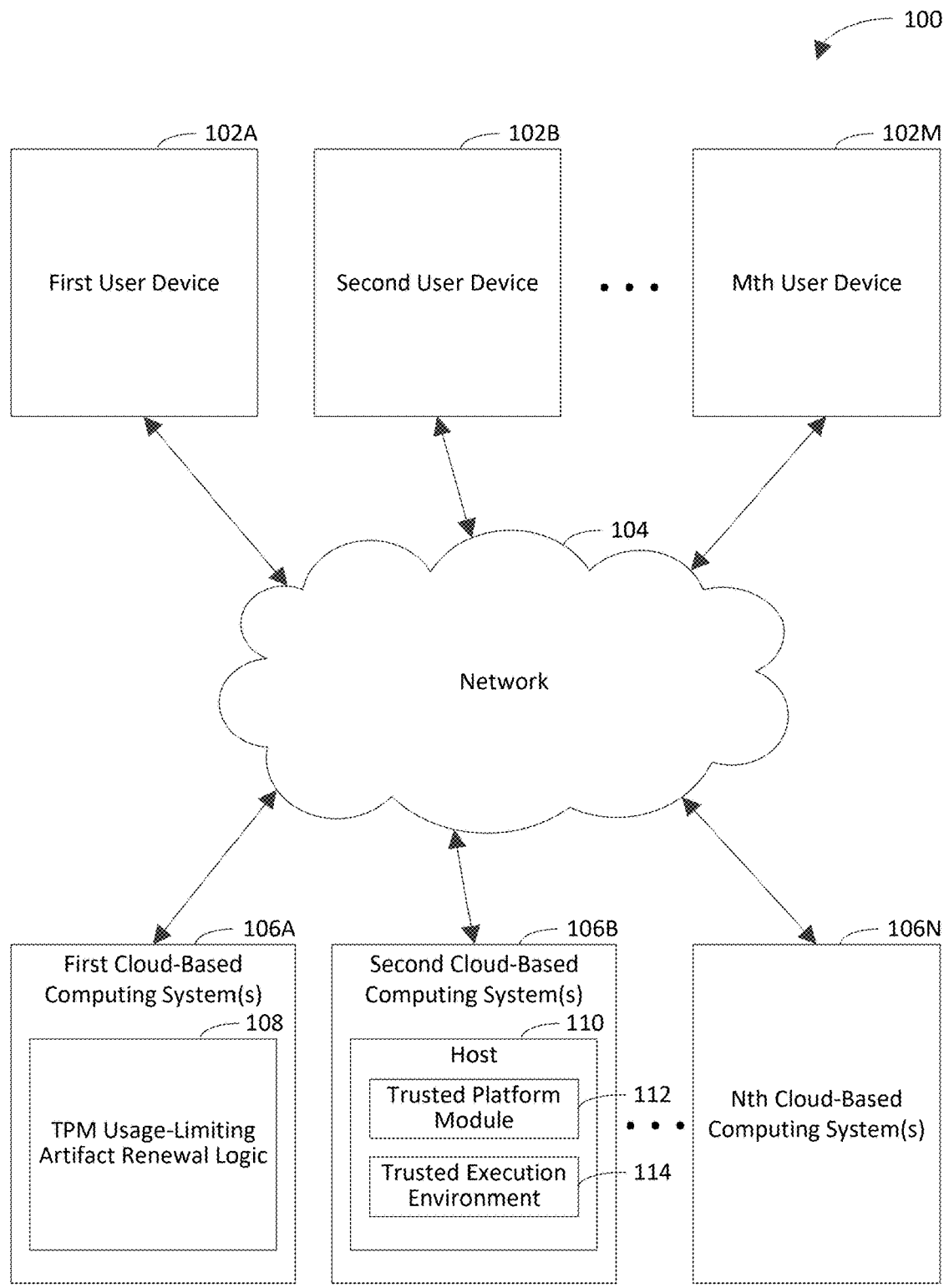
FIG. 1 is a block diagram of an example trusted platform module (TPM) usage-limiting artifact renewal system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to renew a signed attestation artifact (e.g., a device health certificate), which attests to health of a computing system, without using a trusted platform module (TPM) that is included in the computing system. An attestation artifact is an artifact (e.g., a cryptographic key or a measurement) that is capable of being used to establish (e.g., prove) trust in health of a computing system. Health of a computing system indicates whether a configuration (e.g., a measured configuration) of the computing system corresponds to a reference configuration (e.g., an expected configuration) of the computing system. For instance, the health of the computing system may indicate an extent to which the configuration of the computing system corresponds to (e.g., matches) the reference configuration. The configuration of the computing system may include a hardware configuration of the computing system, a software configuration of the computing system, and/or a firmware configuration of the configuration system. A TPM is a microcontroller designed to assure integrity (e.g., expected behavior) of a computing system by integrating attestation artifacts, such as cryptographic keys and unforgeable measurements, into the computing system. Such attestation artifacts may be used to establish a "chain of trust" under which each component of hardware and software of the computing system may be validated (e.g., certified). In an example implementation, the TPM is configured to operate in accordance with the TPM technical specification written by a computer industry consortium called Trusted Computing Group (TCG). In another example implementation, the TPM is implemented as a semiconductor chip that has a randomly created, static endorsement key associated with the chip. The endorsement key has a public portion (a.k.a. a public key) and a private portion (a.k.a. a private key). The private portion does not leave the chip, whereas the public portion is publicly available for attestation and other purposes. An attestation service may verify the health of the computing system for the purpose of renewing the signed attestation artifact by utilizing attestation artifact(s) that are received from the computing system, rather than accessing the TPM to obtain such attestation artifact(s).

In an example implementation, the attestation service validates attestation artifacts that are received from the computing system when a cold boot of the computing system is initiated and inserts at least a subset (e.g., one or more) of the attestation artifacts into the signed attestation artifact that is issued to the computing system by the attestation service. A cold boot of a computing system is a process in which a power source is connected to the computing system. Accordingly, initiation of the cold boot includes connecting the power source to the computing system. If the power source is already connected to the computing system, initiation of the cold boot includes disconnecting the power source from the computing system and then reconnecting the power source to the computing system. A time instance at which the cold boot of the computing system is initiated defines a start of a cold boot session of the computing system. The cold boot session ends at a time instance at which the power source is disconnected from the computing system.

A request to renew the signed attestation artifact, which is received by the attestation service from the computing system, may include the subset of the attestation artifacts that was inserted into the signed attestation artifact when the cold boot of the computing system was initiated. For instance, the request to renew the signed attestation artifact may include the signed attestation artifact, which includes the subset of the attestation artifacts. The attestation service uses the subset of the attestation artifacts (and potentially one or more other attestation artifacts, which may be included in the request to renew the signed attestation artifact) to verify the health of the computing system without a need to interact with the TPM. In this manner, the attestation service is capable of renewing the signed attestation artifact even if the TPM has become unresponsive during the cold boot session.

Example embodiments described herein are capable of renewing a signed attestation artifact, which attests to health of a computing system, with limited usage of a TPM that is included in the computing system. In the embodiments described herein, the computing system is referred to as a host for non-limiting, illustrative purposes. For example, the computing system may host a trusted execution environment (TEE) and/or an instance of a cloud computing service, though the example approaches are not limited in this respect. In accordance with this example, the TEE may be used to facilitate renewal of the signed attestation artifact. In further accordance with this example, the renewal of the signed attestation artifact may be a prerequisite for providing continued access to the instance of the cloud computing service that is hosted by the computing system.

Example techniques described herein have a variety of benefits as compared to conventional techniques for renewing a signed attestation artifact. For instance, the example techniques are capable of renewing a signed attestation artifact that attests to health of a host without interacting with a TPM that is included in the host. Accordingly, the signed attestation artifact may be renewed even if the TPM becomes non-responsive during a cold boot session of the host. For instance, the example techniques may interact with the TPM to generate the signed attestation artifact and not interact with the TPM to renew the signed attestation artifact. By not interacting with the TPM to renew the signed attestation artifact, the example techniques may reduce a likelihood of (e.g., prevent) the TPM entering lockout mode until a next cold boot of the host.

The example techniques increase security of a computing system, which attempts to interact with a host, by attesting to health of the host. Without the example techniques attesting to the health of the host, the health of the host likely would be unknown to the computing system, meaning that the host could unknowingly include (e.g., store or run) malicious software. Accordingly, the example techniques enable the computing system to avoid accessing the host and/or information received from the host if the host includes malicious software. The example techniques increase security of a host by determining whether health of the host has been compromised even if a TPM in the host is unresponsive (e.g., even if the TPM is inaccessible for the purpose of determining the health of the host). By determining that the host includes malicious software, the example techniques are capable of mitigating (e.g., preventing) malicious operations that the malicious software is configured to perform. For instance, the example techniques may be capable of limiting (e.g., terminating or preventing) access to the malicious software and/or removing the malicious software from the host.

The example techniques increase an accuracy, precision, and/or reliability of a determination of whether health of a host has been compromised (e.g., a determination of whether the host includes malicious software). For example, by using artifact(s) received from the host rather than stored artifact(s) in a TPM of the host to determine health of the host, the example techniques may reduce a likelihood of (e.g., avoid) overlooking malicious code that is included in the host.

The example techniques may reduce an amount of time and/or resources (e.g., processor cycles, memory, network bandwidth) that is consumed to determine whether health of a host has been compromised and/or to renew a signed attestation artifact that attests to the health of the host. For instance, without the ability to determine the health of the host when a TPM in the host is non-responsive, the health of the host may be unknown until unidentified malicious code in the host performs malicious operations. Moreover, by enabling the health of the host to be determined even when the TPM in the host is non-responsive, the example techniques are capable of reducing the amount of time and/or resources that otherwise would be consumed to perform remedial actions regarding such unidentified malicious software in the host.

For example, generating a signed attestation artifact, which includes a public portion of an ephemeral cryptographic key that is generated by a trusted execution environment (TEE) in the host, during a cold boot session of the host; providing the signed attestation artifact, which includes the public portion of the ephemeral cryptographic key and the public portion of the signing key, to the host; and renewing the signed attestation artifact during the cold boot session based at least on (e.g., in response to or as a result of) a request to renew the signed attestation artifact, which is received during the cold boot session, including the signed attestation artifact and further based at least on the TEE possessing the ephemeral cryptographic key may reduce the amount of time and/or resources that is consumed by a computing system to determine whether the health of the host has been compromised and/or to renew the signed attestation artifact. By reducing the amount of time and/or resources that is consumed, the efficiency of the computing system may be increased.

The example techniques are capable of increasing a user experience of a user who attempts to interact with a host. For example, by renewing a signed attestation artifact, which attests to health of the host, even if a TPM in the host becomes non-responsive during a cold boot session, a likelihood of the user being negatively affected by unidentified malicious code in the host may be reduced. Accordingly, the example techniques described herein may increase security of the user. The example techniques may increase an efficiency of the user by reducing an amount of time and effort that the user otherwise may have expended to perform remedial actions regarding such unidentified malicious software in the host.

FIG. 1 is a block diagram of an example TPM usage-limiting artifact renewal system 100 in accordance with an embodiment. Generally speaking, the TPM usage-limiting artifact renewal system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the TPM usage-limiting artifact renewal system 100 renews a signed attestation artifact that attests health of a host 110 with limited usage of a TPM 112 that is included in the host 110. Detail regarding techniques for renewing a signed attestation artifact with limited usage of a TPM is provided in the following discussion.

As shown in FIG. 1, the TPM usage-limiting artifact renewal system 100 includes a plurality of user devices 102A-102M, a network 104, and a plurality of cloud-based computing systems 106A-106N. Communication among the user devices 102A-102M and the cloud-based computing systems 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with the cloud-based computing systems 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the cloud-based computing systems 106A-106N for requesting information stored on (or otherwise accessible via) the cloud-based computing systems 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the cloud-based computing systems 106A-106N.

The cloud-based computing systems 106A-106N are capable of communicating with the user devices 102A-102M. The cloud-based computing systems 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the cloud-based computing systems 106A-106N are configured to host respective Web sites, so that the Web sites are accessible to users of the complex expression-based metadata generation system 100.

One example type of computer program that may be executed by one or more of the cloud-based computing systems 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include Google Cloud® program, developed and distributed by Google LLC; Oracle Cloud® program, developed and distributed by Oracle Corporation; Amazon Web Services® program, developed and distributed by Amazon.com, Inc.; Salesforce® program, developed and distributed by Salesforce.com, Inc.; AppSource® and Azure® programs, developed and distributed by Microsoft Corporation; GoDaddy® program, developed and distributed by GoDaddy.com LLC; and Rackspace® program, developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include TPM usage-limiting artifact renewal logic 108 for illustrative purposes. The TPM usage-limiting artifact renewal logic 108 is configured to renew a signed attestation artifact that attests health of the host 110 with limited usage of the TPM 112, which is included in the host 110. In an example implementation, based at least on (e.g., in response to or as a result of) initiation of a cold boot of the host 110, the TPM usage-limiting artifact renewal logic 108 receives attestation artifacts from the host 110. At least a portion of the attestation artifacts is gathered from the TPM 112 in the host 110. The attestation artifacts prove trust in a trusted execution environment (TEE) 114 that runs on (e.g., is hosted by) the host 110. A time instance at which the cold boot of the host 110 is initiated defines a start of a cold boot session. The attestation artifacts include a public portion of an ephemeral cryptographic key that is generated by the TEE 114, a public portion of a signing key that is owned by the TEE 114, and a key claim indicating that the ephemeral cryptographic key is generated by the TEE 114. The ephemeral cryptographic key is configured to expire at a time at which the cold boot session ends. The key claim is signed by a private portion of the signing key. The TPM usage-limiting artifact renewal logic 108 validates the attestation artifacts. Based at least on the attestation artifacts being validated, the TPM usage-limiting artifact renewal logic 108 generates a signed attestation artifact (e.g., a device health certificate), which includes the public portion of the ephemeral cryptographic key and the public portion of the signing key. The TPM usage-limiting artifact renewal logic 108 provides the signed attestation artifact, which includes the public portion of the ephemeral cryptographic key and the public portion of the signing key, to the host 110. The signed attestation artifact attests to health of the host 110. The TPM usage-limiting artifact renewal logic 108 receives a request to renew the signed attestation artifact during the cold boot session. The request includes the signed attestation artifact, which includes the public portion of the ephemeral cryptographic key and the public portion of the signing key. Based at least on the request including the signed attestation artifact, which includes the public portion of the ephemeral cryptographic key and the public portion of the signing key, and further based at least on the TEE 114 possessing the ephemeral cryptographic key, the TPM usage-limiting artifact renewal logic 108 renews the signed attestation artifact during the cold boot session.

The second server(s) 106B are shown to include the host 110 for illustrative purposes. The host includes the TPM 112 and the TEE 114. The TPM 112 is configured to provide assurance regarding integrity (e.g., expected behavior) of the host 110 by integrating attestation artifacts, such as cryptographic key(s) and unforgeable measurement(s), into the host 110. In an aspect, the TPM 112 is a physical hardware component. In another aspect, the TPM 112 is a virtual TPM (vTPM), rather than a physical hardware component. A vTPM is a software emulation of a TPM. The vTPM may be provided by a hypervisor, for example. In yet another aspect, the TPM 112 includes an endorsement key and an attestation key. The endorsement key and the attestation key may help vouch for health of the host 110. Each of the endorsement key and the attestation key is an asymmetric cryptographic key, meaning that each of the endorsement key and the attestation key includes a private portion and a public portion. The private portion remains private within the TPM 112 (i.e., is not shared outside the TPM 112). The public portion is shared outside the TPM 112 for the purpose of establishing a chain of trust with regard to hardware, software, and/or firmware components of the host 110. It should be noted that the endorsement key is included in an endorsement key certificate that is issued to the TPM 112 by a manufacturer of the TPM 112. The endorsement key certificate vouches for the endorsement key.

A TEE is a secure area associated with a platform in a computing system. For example, a TEE may ensure that sensitive data is stored, processed, and protected in an isolated, trusted environment. In another example, a TEE may provide isolated, safe execution of authorized software. Accordingly, a TEE may provide end-to-end security by enforcing protected execution of authenticated code, confidentiality, authenticity, privacy, system integrity, and data access rights. Accordingly, the TEE 114 is a secure area associated with a platform of the host 110. The TEE 114 generates the ephemeral cryptographic key having the public portion that is included in the signed attestation artifact generated by the TPM usage-limiting artifact renewal logic 108. The TEE 114 owns the signing key having the private portion that is used to sign the key claim.

The TPM usage-limiting artifact renewal logic 108 may be implemented in various ways to renew a signed attestation artifact that attests health of the host 110 with limited usage of the TPM 112 that is included in the host 110, including being implemented in hardware, software, firmware, or any combination thereof. For example, the TPM usage-limiting artifact renewal logic 108 may be implemented as computer program code configured to be executed in one or more processors. In another example, at least a portion of the TPM usage-limiting artifact renewal logic 108 may be implemented as hardware logic/electrical circuitry. For instance, at least a portion of the TPM usage-limiting artifact renewal logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the TPM usage-limiting artifact renewal logic 108 may be (or may be included in) a cloud computing program, though the scope of the example embodiments is not limited in this respect.

The TPM usage-limiting artifact renewal logic 108 is shown to be incorporated in the first server(s) 106A for illustrative purposes and is not intended to be limiting. The host 110 is shown to be incorporated in the second server(s) 106B for illustrative purposes and is not intended to be limiting. It will be recognized that the TPM usage-limiting artifact renewal logic 108 (or any portion(s) thereof) may be incorporated in any one or more of the cloud-based computing systems 106A-106N, any one or more of the user devices 102A-102M, or any combination thereof. For example, client-side aspects of the TPM usage-limiting artifact renewal logic 108 may be incorporated in one or more of the user devices 102A-102M, and server-side aspects of the TPM usage-limiting artifact renewal logic 108 may be incorporated in one or more of the cloud-based computing systems 106A-106N.

Figure 2:
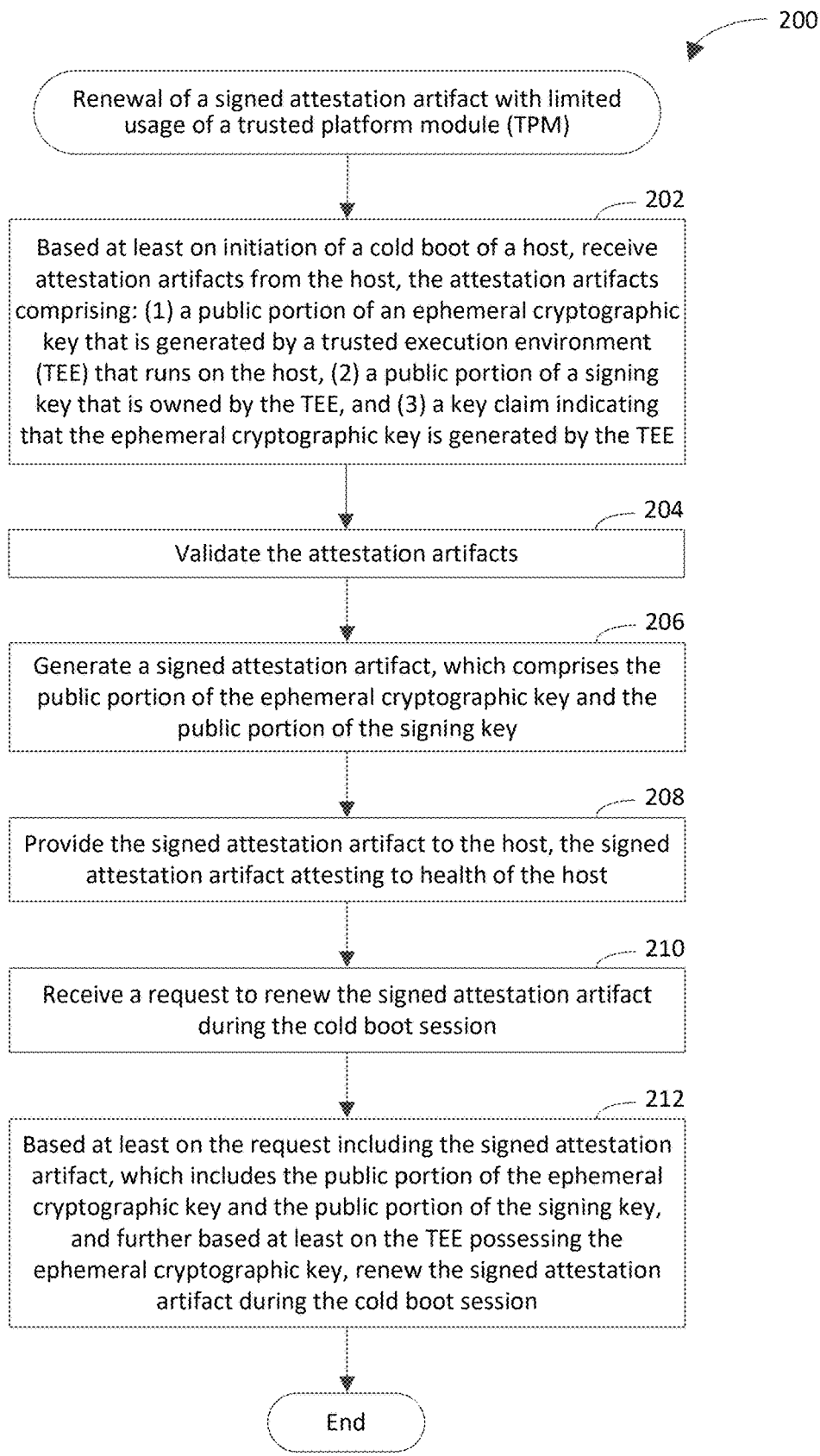
FIGS. 2-3 depict flowcharts of example methods for renewing a signed attestation artifact with limited usage of a TPM in accordance with embodiments.
Figure 3:
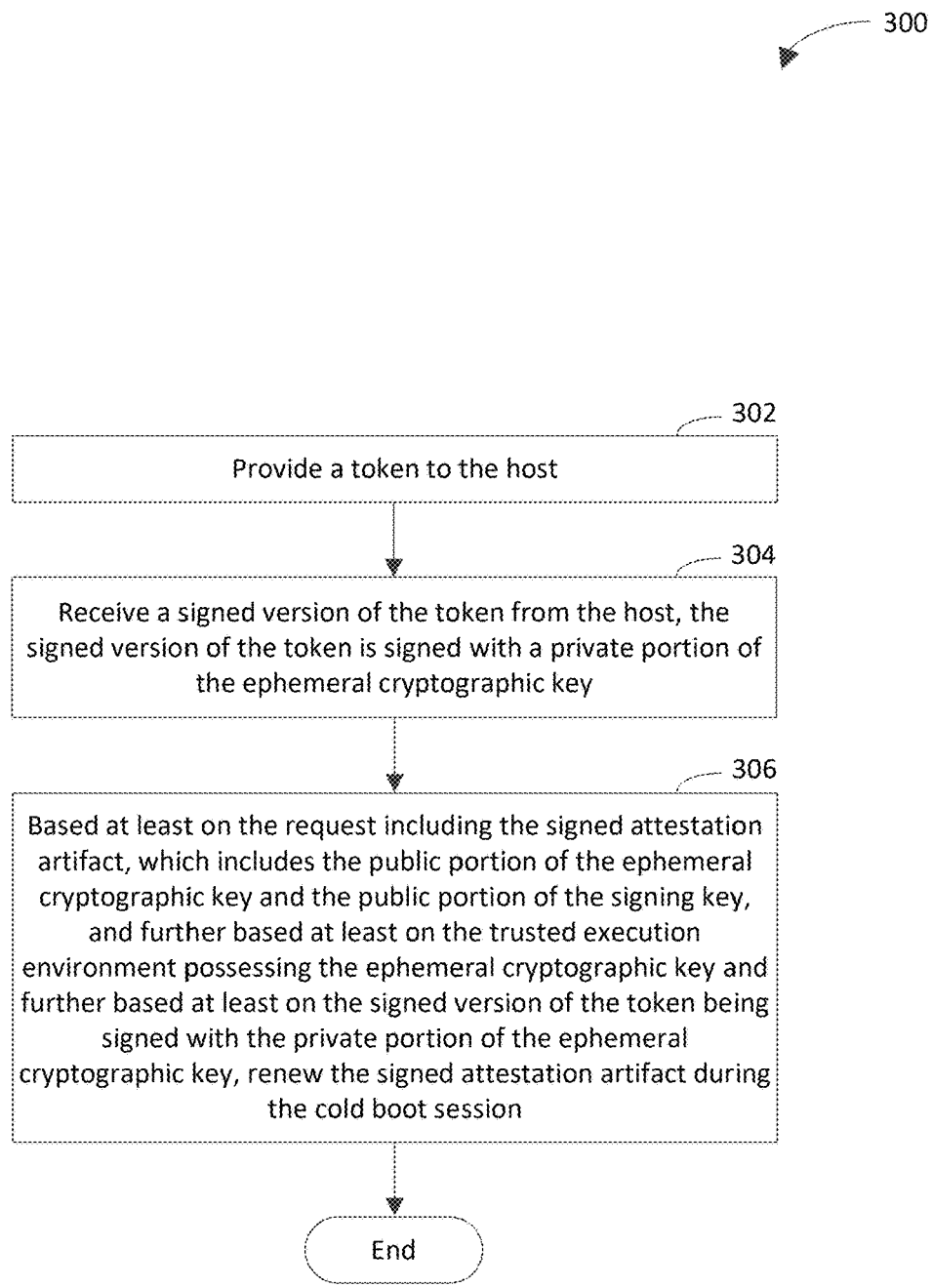
Figure 4:
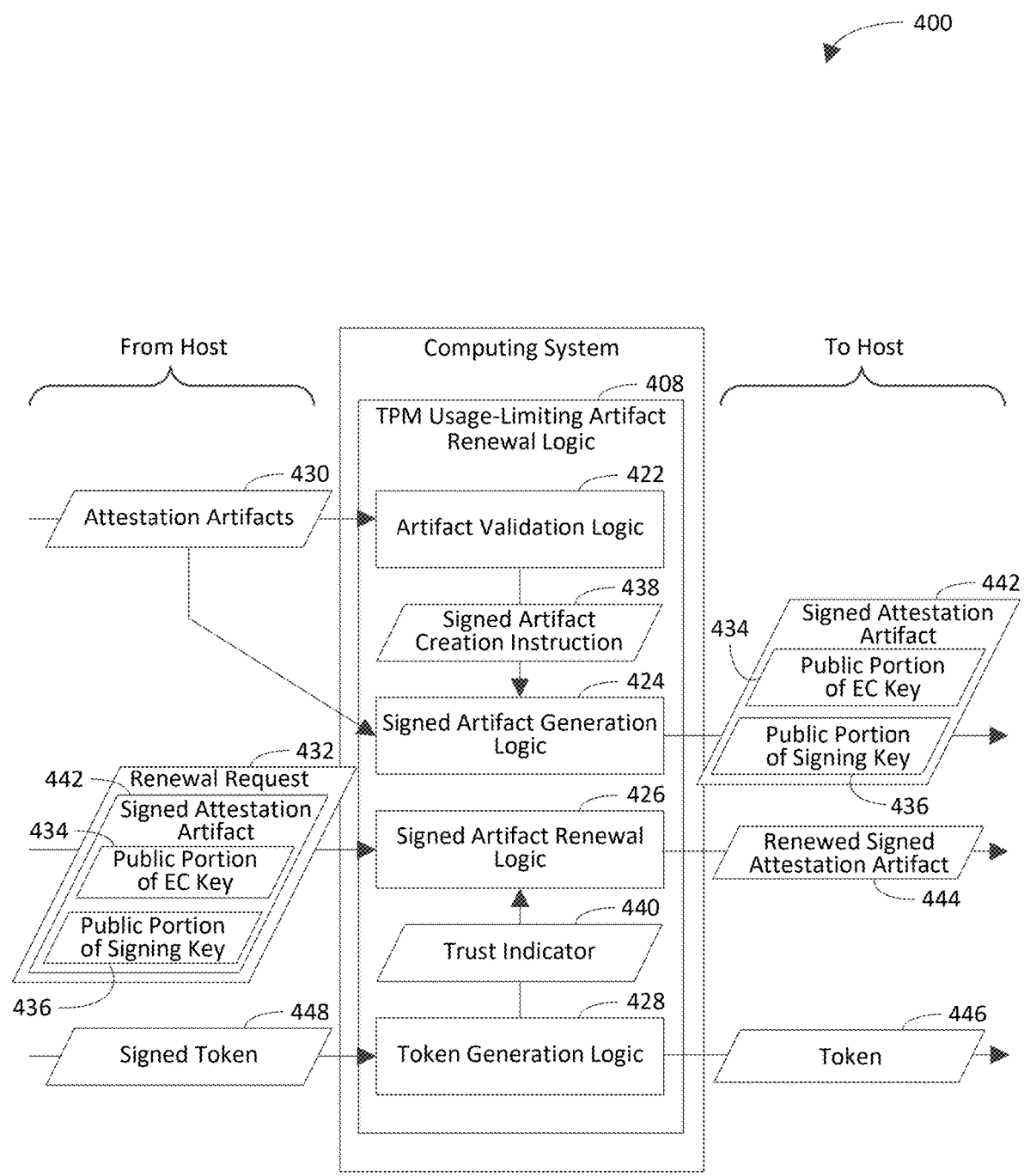
FIG. 4 is a block diagram of an example computing system in accordance with an embodiment.

FIGS. 2-3 depict flowcharts 200 and 300 of example methods for renewing a signed attestation artifact with limited usage of a trusted platform module (TPM) in accordance with embodiments. Flowcharts 200 and 300 may be performed by the first server(s) 106A shown in FIG. 1, for example. For illustrative purposes, flowcharts 200 and 300 are described with respect to a computing system 400 shown in FIG. 4, which is an example implementation of the first server(s) 106A. As shown in FIG. 4, the computing system 400 includes TPM usage-limiting artifact renewal logic 408. The TPM usage-limiting artifact renewal logic 408 includes artifact validation logic 422, signed artifact generation logic 424, signed artifact renewal logic 426, and token generation logic 428. Further structural and operational embodiments will be apparent to persons skilled in the relevant art(s) based on the discussion regarding flowcharts 200 and 300.

As shown in FIG. 2, the method of flowchart 200 begins at step 202. In step 202, based at least on initiation of a cold boot of a host, attestation artifacts are received from the host. At least a portion of the attestation artifacts is gathered from a TPM in the host. The attestation artifacts prove trust in a trusted execution environment (TEE) that runs on the host. In an aspect, the attestation artifacts further prove trust in an operating system that runs on the host. A time instance at which the cold boot of the host is initiated defines a start of a cold boot session. The attestation artifacts include a public portion of an ephemeral cryptographic key that is generated by the TEE, a public portion of a signing key that is owned by the TEE, and a key claim indicating that the ephemeral cryptographic key is generated by the TEE. The ephemeral cryptographic key is configured to expire at a time at which the cold boot session ends. In an aspect, the key claim further indicates that the TEE runs on the host. In another aspect, the key claim further indicates that the ephemeral cryptographic key is configured to expire at the time instance at which the cold boot session ends. The key claim is signed by a private portion of the signing key. In an aspect, the key claim being signed by the private portion of the signing key establishes trust that the TEE possesses the ephemeral cryptographic key (including a private portion of the ephemeral cryptographic key and the public portion of the ephemeral cryptographic key). The TEE possessing the ephemeral cryptographic key indicates that the TEE will not divulge the private portion of the ephemeral cryptographic key. In an example implementation, based at least on initiation of the cold boot of the host, the artifact validation logic 412 receives attestation artifacts 430 from the host. At least a portion of the attestation artifacts 430 is gathered from the TPM in the host. The attestation artifacts 430 include a public portion (labeled "Public Portion of EC Key") 434 of the ephemeral cryptographic key, a public portion 436 of the signing key, and a signed key claim. The signed key claim is the key claim signed by the private portion of the signing key.

At step 204, the attestation artifacts are validated. In an aspect, validating the attestation artifacts includes establishing trust in the attestation artifacts. In an example implementation, the artifact validation logic 422 validates the attestation artifacts 430. The artifact validation logic 422 generates a signed artifact creation instruction 438 based at least on validating the attestation artifacts 430. The signed artifact creation instruction 438 instructs the signed artifact generation logic 424 to generate a signed attestation artifact 442.

At step 206, based at least on the attestation artifacts being validated, a signed attestation artifact, which includes the public portion of the ephemeral cryptographic key and the public portion of the signing key, is generated. In an aspect, the signed attestation artifact enables the host to communicate with other hosts by indicating to the other hosts that the host has been attested. In an example implementation, based at least on the attestation artifacts being validated, the signed artifact generation logic 424 generates the signed attestation artifact 442, which includes the public portion 434 of the ephemeral cryptographic key and the public portion 436 of the signing key. For instance, the signed artifact generation logic 424 may generate the signed attestation artifact 442 based at least on receipt of the signed artifact creation instruction 438 (e.g., based at least on the signed artifact creation instruction 438 instructing the signed artifact generation logic 424 to generate the signed attestation artifact 442.

At step 208, the signed attestation artifact, which includes the public portion of the ephemeral cryptographic key and the public portion of the signing key, is provided to the host. The signed attestation artifact attests to health of the host. In an example implementation, the signed artifact generation logic 424 provides the signed attestation artifact 442, which includes the public portion 434 of the ephemeral cryptographic key and the public portion 436 of the signing key, to the host. The signed attestation artifact 442 attests to health of the host.

At step 210, a request to renew the signed attestation artifact is received during the cold boot session. The request includes the signed attestation artifact, which includes the public portion of the ephemeral cryptographic key and the public portion of the signing key. In an aspect, inclusion of the public portion of the ephemeral cryptographic key in the request to renew proves that the request to renew is received during the cold boot session. In an example implementation, the signed artifact renewal logic 426 receives a renewal request 432, which indicates that the signed attestation artifact 442 is to be renewed, during the cold boot session. The renewal request 432 includes the signed attestation artifact 442, which includes the public portion 434 of the ephemeral cryptographic key and the public portion 436 of the signing key.

At step 212, based at least on the request including the signed attestation artifact, which includes the public portion of the ephemeral cryptographic key and the public portion of the signing key, and further based at least on the TEE possessing the ephemeral cryptographic key, the signed attestation artifact is renewed during the cold boot session. In an aspect, the signed attestation artifact is renewed without interacting (e.g., communicating) with the TPM in the host. In an example implementation, based at least on the renewal request 432 including the signed attestation artifact 442, which includes the public portion 434 of the ephemeral cryptographic key and the public portion 436 of the signing key, and further based at least on the TEE possessing the ephemeral cryptographic key, the signed artifact renewal logic 426 renews the signed attestation artifact 442 during the cold boot session. In accordance with this implementation, the signed artifact renewal logic 426 provides a renewed signed attestation artifact 444, which is a renewed version of the signed attestation artifact 442. For instance, the signed artifact renewal logic 426 may provide the renewed signed attestation artifact 444 to the host.

In an example embodiment, generating the signed attestation artifact at step 206 includes incorporating the public portion of the signing key into the signed attestation artifact. In accordance with this embodiment, the request to renew the signed attestation artifact further includes a property claim regarding dynamic properties of the host. The property claim is signed by the private portion of the signing key. The dynamic properties of the host are properties of the host that are capable of changing during the cold boot session. For instance, the dynamic properties of the host may change based at least on occurrence of a kernel soft reset of the host. A kernel soft reset of a host is a reboot of the host that does not include a reboot of a TPM in the host. The kernel soft reset may include rebooting an operating system that runs on the host while maintaining (e.g., preserving) operation of virtual machine(s) that run on the host. For instance, the kernel soft reset may include loading new boot drivers, attaching a kernel debugger, and so on. Examples of a dynamic property of a host include a runtime kernel soft reset-based security measurement of the host and a runtime measurement associated with a dynamic policy of the host. In further accordance with this embodiment, renewing the signed attestation artifact during the cold boot session at step 212 is further based at least on the request to renew the signed attestation artifact including the property claim signed by the private portion of the signing key and further based at least on incorporation of the public portion of the signing key into the signed attestation artifact indicating trust in the TEE.

In an aspect of this embodiment, the property claim identifies an updated TEE that is created in the host as a result of a kernel soft reset of the host during the cold boot session. The updated TEE is an updated version of the TEE. In accordance with this aspect, the property claim being signed by the private portion of the signing key establishes trust in the updated TEE.

In an example of this aspect, the property claim includes a public portion of a second signing key that is owned by the updated TEE. In accordance with this example, renewing the signed attestation artifact at step 212 includes incorporating the public portion of the second signing key into the signed attestation artifact. In an aspect of this example, the public portion of the second signing key in the property claim is signed with the private portion of the signing key. In accordance with this aspect, renewing the signed attestation artifact at step 212 is based at least on a verification that the public portion of the second signing key in the property claim is signed with the private portion of the signing key of the TEE. In further accordance with this aspect, renewing the signed attestation artifact at step 212 may be further based at least on the public portion of the ephemeral cryptographic key that is included in the request to renew the signed attestation artifact being signed by a private portion of the second signing key.

In another aspect of this embodiment, the attestation artifacts further include an event log, which includes a description of events that occur with regard to the host during the cold boot of the host. In accordance with this aspect, validating the attestation artifacts at step 204 includes verifying that a designated portion of the event log, which is generated prior to a kernel soft reset of the host during the cold boot session, satisfies a static policy regarding static properties of the host. The static properties of the host are properties of the host that are incapable of changing during the cold boot session. Examples of a static property of a host include a static measurement of a basic input/output system (BIOS) that is included in the host and a static measurement of an operating system that is included in the host.

In an example of this aspect, validating the attestation artifacts at step 204 includes verifying that the event log satisfies a dynamic policy regarding the dynamic properties of the host. In another example of this aspect, renewing the signed attestation artifact during the cold boot session at step 212 includes incorporating an encoded representation of the event log into the signed attestation artifact. The encoded representation of the event log includes the designated portion, which is generated prior to the kernel soft reset of the host during the cold boot session, and a subsequent portion, which is generated after the kernel soft reset of the host during the cold boot session.

In another example embodiment, renewing the signed attestation artifact during the cold boot session at step 212 includes providing a renewed version of the signed attestation artifact. In accordance with this embodiment, providing the renewed version of the signed attestation artifact includes encrypting the renewed version of the signed attestation artifact with the public portion of the ephemeral cryptographic key. In an example implementation, the signed artifact renewal logic 426 uses the public portion 434 of the ephemeral cryptographic key to encrypt the renewed signed attestation artifact 444, which results in an encrypted renewed signed attestation artifact. In an aspect, by using the public portion 434 of the ephemeral cryptographic key to encrypt the renewed signed attestation artifact 444, the signed artifact renewal logic 426 infers that the TEE possesses the ephemeral cryptographic key. For example, if the TEE possesses the ephemeral cryptographic key, the host is able to decrypt the encrypted renewed signed attestation artifact using a private portion of the ephemeral cryptographic key. In accordance with this example, if the TEE does not possess the ephemeral cryptographic key, the host is not able to decrypt the encrypted renewed signed attestation artifact.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, step 212 of flowchart 200 is replaced with one or more of the steps shown in flowchart 300 of FIG. 3. As shown in FIG. 3, the method of flowchart 300 begins at step 302. In step 302, a token is provided to the host. For example, the token may be a nonce. In accordance with this example, the nonce may be configured for a one-time use. In an example implementation, the token generation logic 428 provides a token 446 to the host.

At step 304, a signed version of the token is received from the host. The signed version of the token is signed with a private portion of the ephemeral cryptographic key. In an aspect, receiving the signed version of the token, which is signed with the private portion of the ephemeral cryptographic key, from the host at step 304 proves that the TEE possesses the ephemeral cryptographic key. In an example, receiving the signed version of the token from the host proves that the ephemeral cryptographic key is still alive (i.e., the ephemeral cryptographic key has not expired). In another example, receiving the signed version of the token from the host proves that the cold boot session has not ended. In an example implementation, the token generation logic 428 receives a signed token 448, which is a signed version of the token 446, from the host. In accordance with this implementation, the signed token 448 is signed with the private portion of the ephemeral cryptographic key.

At step 306, based at least on the request to renew including the signed attestation artifact, which includes the public portion of the ephemeral cryptographic key and the public portion of the signing key, and further based at least on the trusted execution environment possessing the ephemeral cryptographic key and further based at least on the signed version of the token being signed with the private portion of the ephemeral cryptographic key, the signed attestation artifact is renewed during the cold boot session. In an example implementation, based at least on the renewal request 432 including the signed attestation artifact 442, which includes the public portion 434 of the ephemeral cryptographic key and the public portion 436 of the signing key, and further based at least on the trusted execution environment possessing the ephemeral cryptographic key and further based at least on the signed token 448 being signed with the private portion of the ephemeral cryptographic key, the signed artifact renewal logic 426 renews the signed attestation artifact 442 during the cold boot session. In an aspect, the signed token 448 being signed with the private portion of the ephemeral cryptographic key proves that the ephemeral key has not yet expired because the host is currently able to create a cryptographic signature with the private portion of the ephemeral cryptographic key. In another aspect, the signed artifact generation logic 424 including the signed attestation artifact 442, which includes the public portion 434 of the ephemeral cryptographic key and the public portion 436 of the signing key, in the signed attestation artifact 442, as described above with reference to step 206 shown in FIG. 2, indicates that the TPM usage-limiting artifact renewal logic 408 trusts that the ephemeral cryptographic key is configured to expire at the time at which the cold boot session of the host ends.

In an aspect, the signed version of the token being signed with the private portion of the ephemeral cryptographic key proves that static properties of the host are unchanged during the cold boot session. The static properties of the host are properties of the host that are incapable of changing during the cold boot session.

It will be recognized that the computing system 400 may not include one or more of the TPM usage-limiting artifact renewal logic 408, the artifact validation logic 422, the signed artifact generation logic 424, the signed artifact renewal logic 426, and/or the token generation logic 428. Furthermore, the computing system 400 may include components in addition to or in lieu of the TPM usage-limiting artifact renewal logic 408, the artifact validation logic 422, the signed artifact generation logic 424, the signed artifact renewal logic 426, and/or the token generation logic 428.

Figure 5:
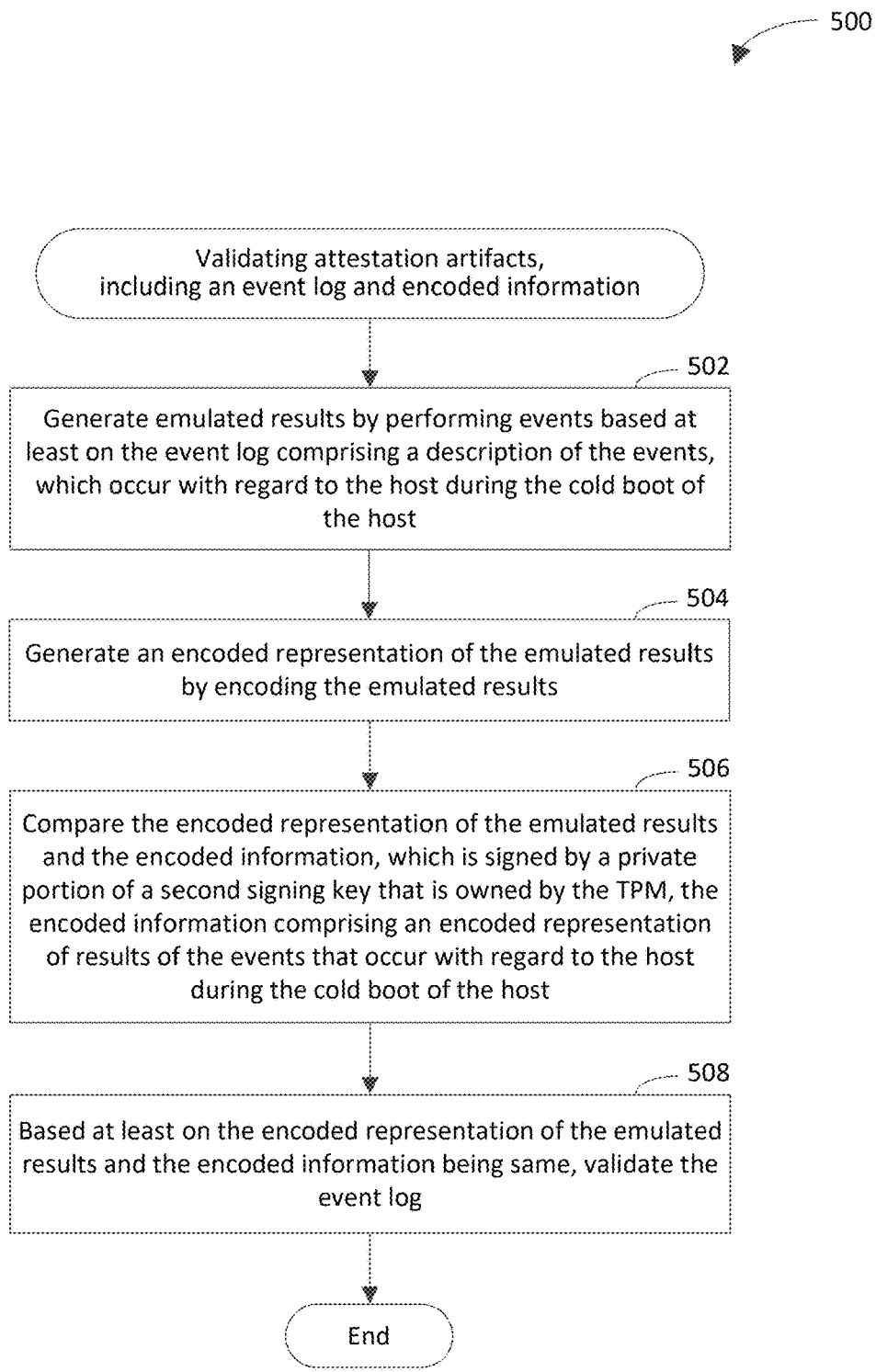
FIG. 5 depicts a flowchart of an example method for validating attestation artifacts, including an event log and encoded information, in accordance with an embodiment.
Figure 6:
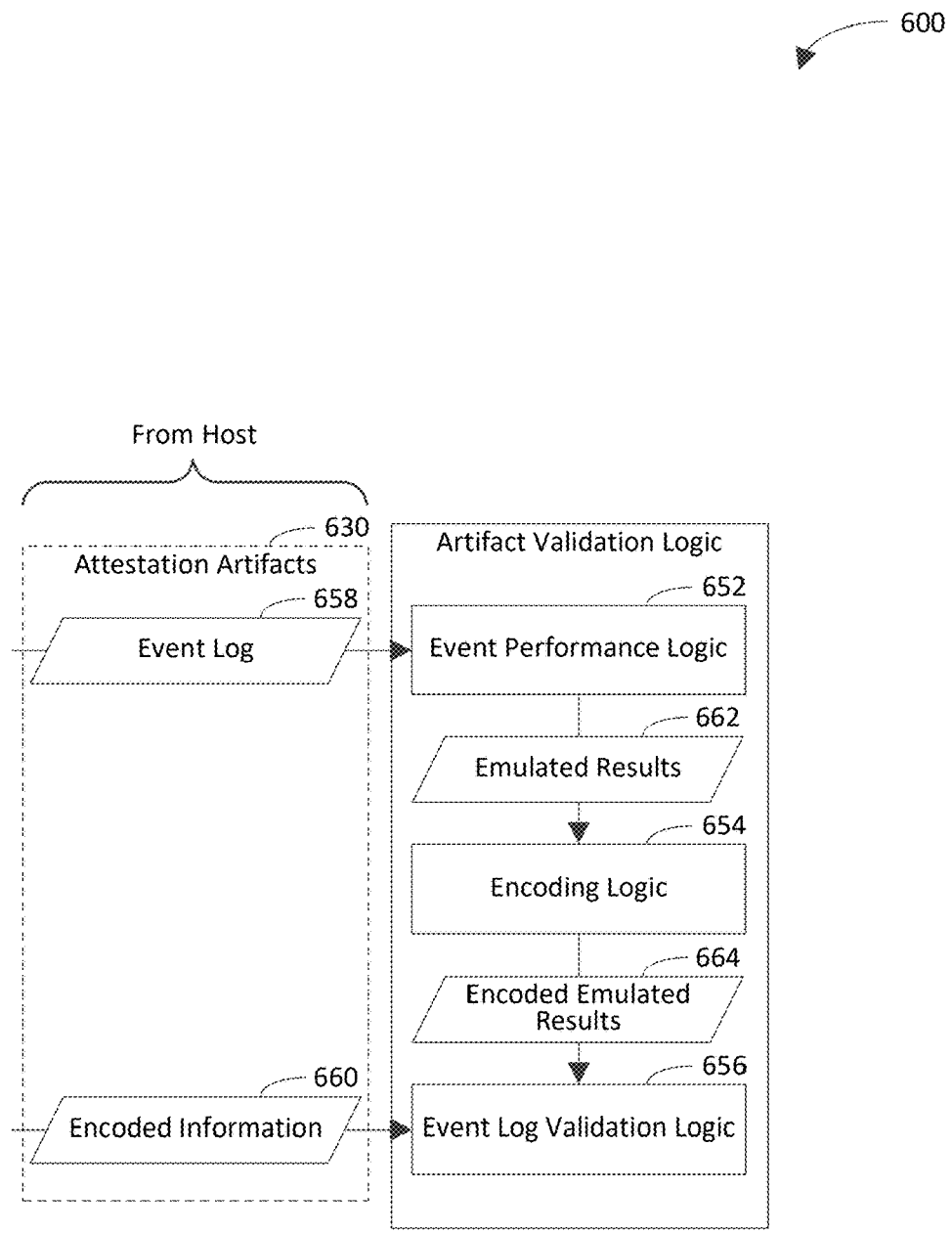
FIG. 6 is a block diagram of an example implementation of artifact validation logic shown in FIG. 4 in accordance with an embodiment.

In another example embodiment, step 204 of flowchart 200 includes one or more of the steps shown in flowchart 500 of FIG. 5. The flowchart 500 illustrates an example method for validating attestation artifacts, including an event log and encoded information, in accordance with an embodiment. Flowchart 500 may be performed by an artifact validation logic 422 shown in FIG. 4, for example. For illustrative purposes, flowchart 500 is described with respect to artifact validation logic 600 shown in FIG. 6, which is an example implementation of the artifact validation logic 422. As shown in FIG. 6, the artifact validation logic 600 includes event performance logic 652, encoding logic 654, and event log validation logic 656. Further structural and operational embodiments will be apparent to persons skilled in the relevant art(s) based on the discussion regarding flowchart 500.

As shown in FIG. 5, the method of flowchart 500 begins at step 502. In step 502, emulated results are generated by performing events based at least on the event log comprising a description of the events, which occur with regard to the host during the cold boot of the host. In an aspect, the emulated results include emulated values of platform configuration registers of the TPM in the host. In an example implementation, the event performance logic 652 generates emulated results 662 by performing the events based at least on an event log 658 comprising a description of the events.

At step 504, an encoded (e.g., hashed) representation of the emulated results is generated by encoding the emulated results. In an example implementation, the encoding logic 654 generates encoded emulation results 664, which are an encoded representation of the emulated results 662, by encoding the emulated results 662.

At step 506, the encoded representation of the emulated results and the encoded information, which is signed by a private portion of a second signing key that is owned by the TPM, are compared. The encoded information includes an encoded representation of results of the events that occur with regard to the host during the cold boot of the host. In an aspect, the results of the events include values of platform configuration registers of the TPM in the host. In an example implementation, the event log validation logic 656 compares the encoded emulated results 664 and encoded information 660, which is signed by the private portion of the second signing key. The encoded information 660 includes the encoded representation of the results of the events that occur with regard to the host during the cold boot of the host.

At step 508, based at least on the encoded representation of the emulated results and the encoded information being same, the event log is validated. In an example implementation, based at least on the encoded emulated results 664 and the encoded information 660 being same, the event log validation logic 656 validates the event log 658.

In some example embodiments, one or more steps 502, 504, 506, and/or 508 of flowchart 500 may not be performed. Moreover, steps in addition to or in lieu of steps 502, 504, 506, and/or 508 may be performed.

It will be recognized that the artifact validation logic 600 may not include one or more of the event performance logic 652, the encoding logic 654, and/or the event log validation logic 656. Furthermore, the artifact validation logic 600 may include components in addition to or in lieu of the event performance logic 652, the encoding logic 654, and/or the event log validation logic 656.

Figure 7:
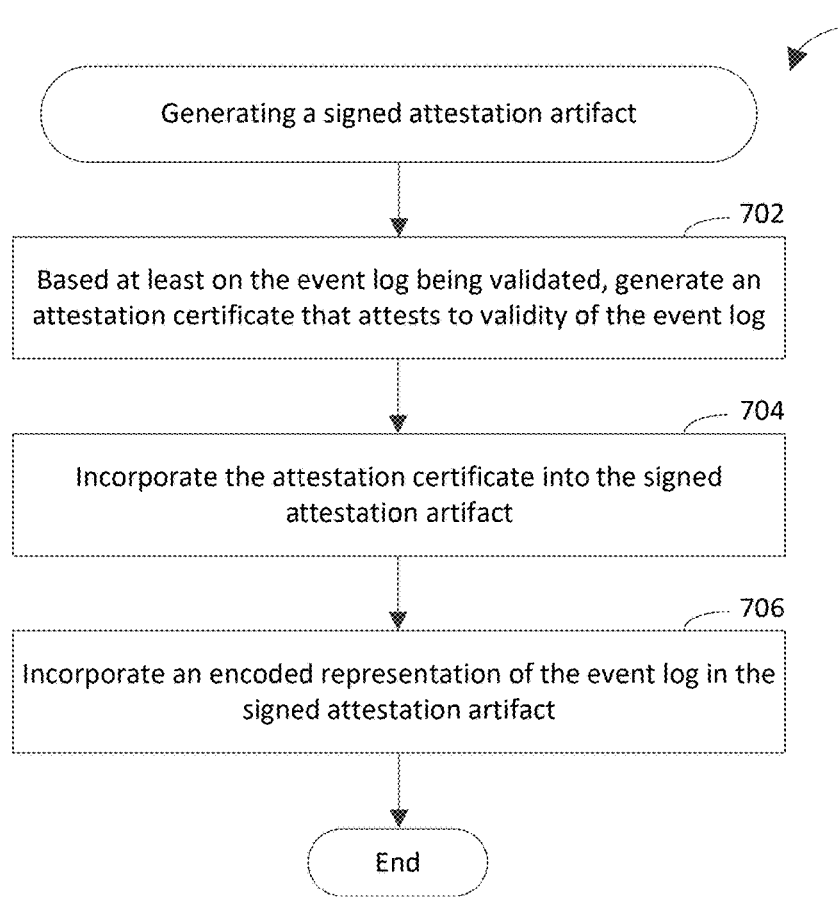
FIG. 7 depicts a flowchart of an example method for generating a signed attestation artifact in accordance with an embodiment.
Figure 8:
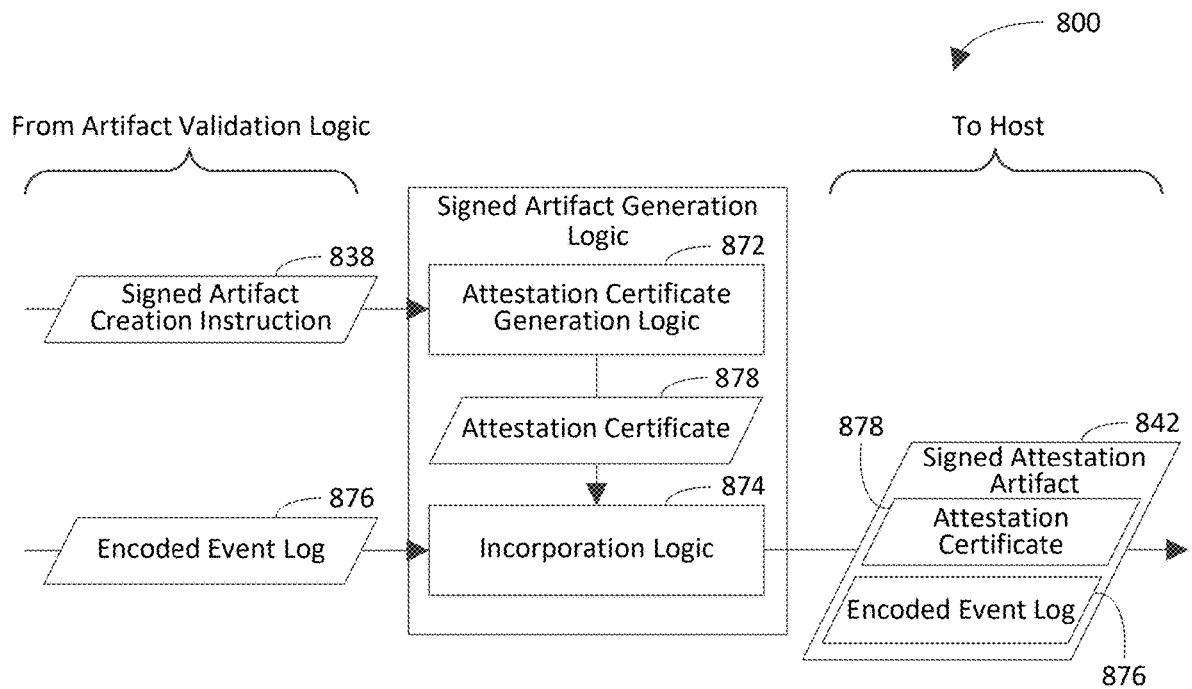
FIG. 8 is a block diagram of an example implementation of certificate generation logic shown in FIG. 4 in accordance with an embodiment.

In an aspect of this embodiment, step 206 of flowchart 200 includes one or more of the steps shown in flowchart 700 of FIG. 7. The flowchart 700 illustrates an example method for generating a signed attestation artifact in accordance with an embodiment. Flowchart 700 may be performed by a signed artifact generation logic 424 shown in FIG. 4, for example. For illustrative purposes, flowchart 700 is described with respect to signed artifact generation logic 800 shown in FIG. 8, which is an example implementation of the signed artifact generation logic 424. As shown in FIG. 8, the signed artifact generation logic 800 includes attestation certificate generation logic 872 and incorporation logic 874. Further structural and operational embodiments will be apparent to persons skilled in the relevant art(s) based on the discussion regarding flowchart 700.

As shown in FIG. 7, the method of flowchart 700 begins at step 702. In step 702, based at least on the event log being validated, an attestation certificate that attests to validity of the event log is generated. In an example implementation, based at least on the event log being validated, the attestation certificate generation logic 872 generates an attestation certificate 878 that attests to validity of the event log. For example, the attestation certificate generation logic 872 may generate the attestation certificate 878 based at least on receipt of a signed artifact creation instruction 838 (e.g., based at least on the signed artifact creation instruction 838 indicating that the event log has been validated). For instance, the event log validation logic 656 shown in FIG. 6 may generate the certificate instruction 838 based at least on the event log being validated. In an aspect, the attestation certificate generation logic 872 generates the attestation certificate 878 by signing an attestation key, which is included in the TPM of the host, based at least on an endorsement key that is included in the TPM being associated with the host and further based at least on an endorsement key certificate that is issued by the TPM vouching for the endorsement key. In accordance with this aspect, the attestation certificate 878 may be configured to be accessed only on a device that includes the TPM to which the endorsement key belongs. Thus, in accordance with this aspect, the attestation certificate 878 may be accessible only on the host, which includes the TPM.

At step 704, the attestation certificate is incorporated into the signed attestation artifact. In an example implementation, the incorporation logic 874 incorporates the attestation certificate 878 into a signed attestation artifact 842.

At step 706, an encoded representation of the event log is incorporated into the signed attestation artifact. In an example implementation, the incorporation logic 874 incorporates an encoded event log 876, which is the encoded representation of the event log, into the signed attestation artifact 842. For instance, the encoding logic 654 shown in FIG. 6 may generate the encoded event log 876 by encoding the event log (e.g., event log 658). In accordance with this implementation, the incorporation logic 874 may provide the signed attestation artifact 842, including the attestation certificate 878 and the encoded event log 876, to the host.

In an aspect, the signed attestation artifact 842 is sealed to the endorsement key that is included in the TPM of the host. In another aspect, the signed attestation artifact 842 is sealed to the emulated results 662 described above with reference to FIG. 6.

In some example embodiments, one or more steps 702, 704, and/or 706 of flowchart 700 may not be performed. Moreover, steps in addition to or in lieu of steps 702, 704, and/or 706 may be performed.

It will be recognized that the signed artifact generation logic 800 may not include the attestation certificate generation logic 872 and/or the incorporation logic 874. Furthermore, the signed artifact generation logic 800 may include components in addition to or in lieu of the attestation certificate generation logic 872 and/or the incorporation logic 874.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the TPM usage-limiting artifact renewal logic 108, the trusted platform module 112, the trusted execution environment 114, the TPM usage-limiting artifact renewal logic 408, the artifact validation logic 422, the signed artifact generation logic 424, the signed artifact renewal logic 426, the token generation logic 428, the event performance logic 652, the encoding logic 654, the event log validation logic 656, the attestation certificate generation logic 872, the incorporation logic 874, flowchart 200, flowchart 300, flowchart 500, and/or flowchart 700 may be implemented in hardware, software, firmware, or any combination thereof.

For example, any one or more of the TPM usage-limiting artifact renewal logic 108, the trusted platform module 112, the trusted execution environment 114, the TPM usage-limiting artifact renewal logic 408, the artifact validation logic 422, the signed artifact generation logic 424, the signed artifact renewal logic 426, the token generation logic 428, the event performance logic 652, the encoding logic 654, the event log validation logic 656, the attestation certificate generation logic 872, the incorporation logic 874, flowchart 200, flowchart 300, flowchart 500, and/or flowchart 700 may be implemented, at least in part, as computer program code configured to be executed in one or more processors.

In another example, any one or more of the TPM usage-limiting artifact renewal logic 108, the trusted platform module 112, the trusted execution environment 114, the TPM usage-limiting artifact renewal logic 408, the artifact validation logic 422, the signed artifact generation logic 424, the signed artifact renewal logic 426, the token generation logic 428, the event performance logic 652, the encoding logic 654, the event log validation logic 656, the attestation certificate generation logic 872, the incorporation logic 874, flowchart 200, flowchart 300, flowchart 500, and/or flowchart 700 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
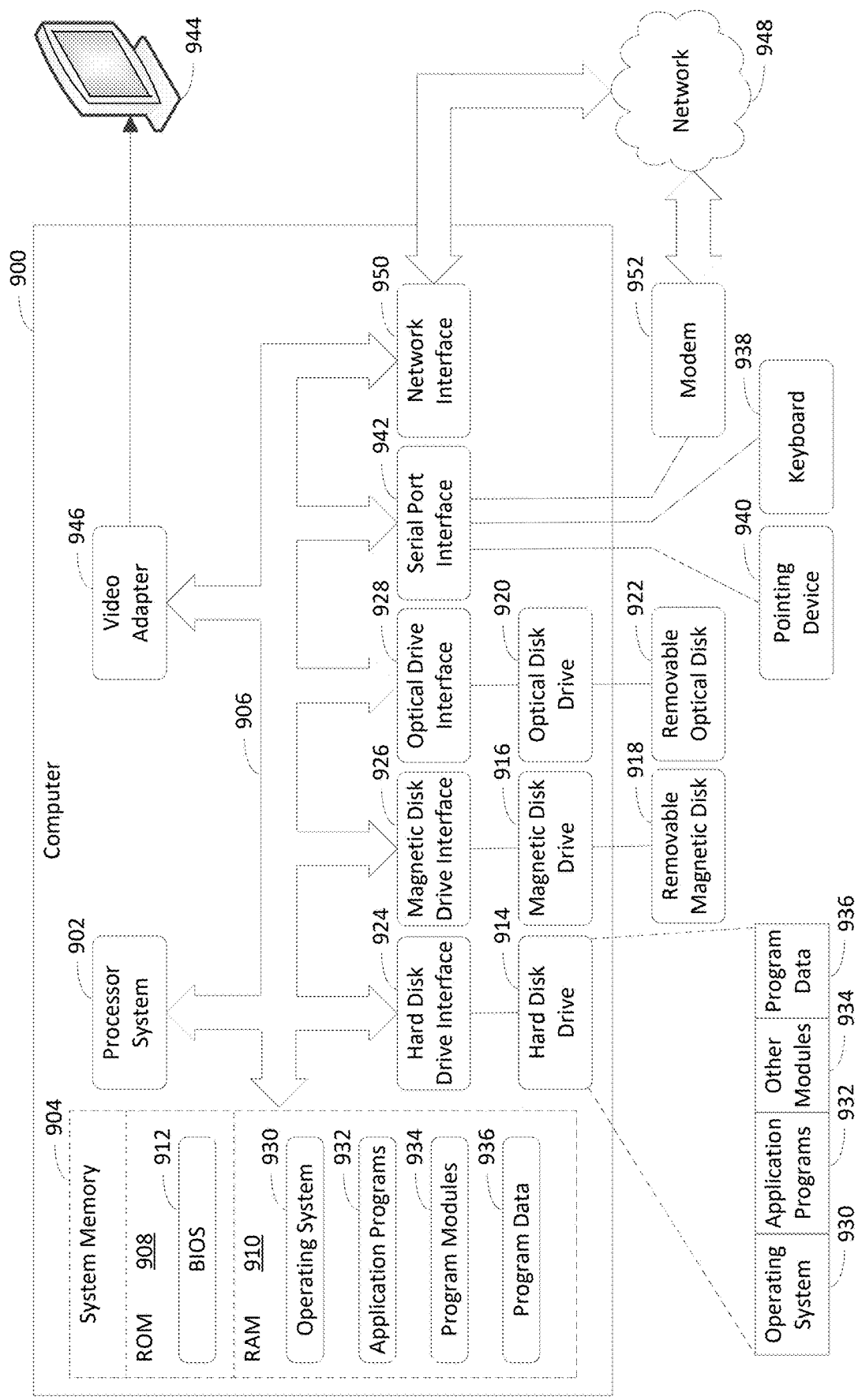
FIG. 9 depicts an example computer in which embodiments may be implemented.

II. Further Discussion of Some Example Embodiments (A1) An example computing system (FIG. 1, 102A-102M, 106A-106N; FIG. 4, 400; FIG. 9, 900) comprises a processor system (FIG. 9, 902) and a memory (FIG. 9, 904, 908, 910) that stores computer-executable instructions. The computer-executable instructions are executable by the processor system to at least, based at least on initiation of a cold boot of a host, receive (FIG. 2, 202) attestation artifacts (FIG. 4, 430) from the host (FIG. 1, 110). At least a portion of the attestation artifacts is gathered from a trusted platform module (FIG. 1, 112) in the host. The attestation artifacts prove trust in a trusted execution environment (FIG. 1, 114) that runs on the host. A time instance at which the cold boot of the host is initiated defines a start of a cold boot session. The attestation artifacts comprise: a public portion (FIG. 4, 434) of an ephemeral cryptographic key that is generated by the trusted execution environment, a public portion (FIG. 4, 436) of a signing key that is owned by the trusted execution environment, and a key claim indicating that the ephemeral cryptographic key is generated by the trusted execution environment. The ephemeral cryptographic key is configured to expire at a time at which the cold boot session ends. The key claim is signed by a private portion of the signing key. The computer-executable instructions are executable by the processor system further to at least validate (FIG. 2, 204) the attestation artifacts. The computer-executable instructions are executable by the processor system further to at least, based at least on the attestation artifacts being validated, generate (FIG. 2, 206) a signed attestation artifact (FIG. 4, 442; FIG. 8, 842), which comprises the public portion of the ephemeral cryptographic key and the public portion of the signing key. The computer-executable instructions are executable by the processor system further to at least provide (FIG. 2, 208) the signed attestation artifact, which comprises the public portion of the ephemeral cryptographic key and the public portion of the signing key, to the host. The signed attestation artifact attests to health of the host. The computer-executable instructions are executable by the processor system further to at least receive (FIG. 2, 210) a request (FIG. 4, 432) to renew the signed attestation artifact during the cold boot session. The request comprises the signed attestation artifact, which comprises the public portion of the ephemeral cryptographic key and the public portion of the signing key. The computer-executable instructions are executable by the processor system further to at least, based at least on the request comprising the signed attestation artifact, which comprises the public portion of the ephemeral cryptographic key and the public portion of the signing key, and further based at least on the trusted execution environment possessing the ephemeral cryptographic key, renew (FIG. 2, 212) the signed attestation artifact during the cold boot session.

(A2) In the example computing system of A1, wherein the computer-executable instructions are executable by the processor system to at least: provide a renewed version of the signed attestation artifact by renewing the signed attestation artifact; and encrypt the renewed version of the signed attestation artifact with the public portion of the ephemeral cryptographic key.

(A3) In the example computing system of any of A1-A2, wherein the attestation artifacts further comprise: an event log, which comprises a description of events that occur with regard to the host during the cold boot of the host; and encoded information signed by a private portion of a second signing key that is owned by the trusted platform module, the encoded information comprising an encoded representation of results of the events that occur with regard to the host during the cold boot of the host; and wherein the computer-executable instructions are executable by the processor system to validate the attestation artifacts by performing at least the following: generate emulated results by performing the events based at least on the event log; generate an encoded representation of the emulated results by encoding the emulated results; compare the encoded representation of the emulated results and the encoded information; and based at least on the encoded representation of the emulated results and the encoded information being same, validate the event log.

(A4) In the example computing system of any of A1-A3, wherein the computer-executable instructions are executable by the processor system to generate the signed attestation artifact by performing at least the following: based at least on the event log being validated, generate an attestation certificate that attests to validity of the event log; incorporate the attestation certificate into the signed attestation artifact; and incorporate an encoded representation of the event log into the signed attestation artifact.

(A5) In the example computing system of any of A1-A4, wherein the computer-executable instructions are executable by the processor system to at least: provide a token to the host; receive a signed version of the token from the host, the signed version of the token is signed with a private portion of the ephemeral cryptographic key; and renew the signed attestation artifact during the cold boot session further based at least on the signed version of the token being signed with the private portion of the ephemeral cryptographic key.

(A6) In the example computing system of any of A1-A5, wherein the signed version of the token being signed with the private portion of the ephemeral cryptographic key proves that static properties of the host are unchanged during the cold boot session; and wherein the static properties of the host are properties of the host that are incapable of changing during the cold boot session.

(A7) In the example computing system of any of A1-A6, wherein the request to renew the signed attestation artifact further comprises a property claim regarding dynamic properties of the host, the property claim signed by the private portion of the signing key, wherein the dynamic properties of the host are properties of the host that are capable of changing during the cold boot session; and wherein the computer-executable instructions are executable by the processor system to at least: incorporate the public portion of the signing key into the signed attestation artifact; and renew the signed attestation artifact during the cold boot session further based at least on the request to renew the signed attestation artifact comprising the property claim signed by the private portion of the signing key and further based at least on incorporation of the public portion of the signing key into the signed attestation artifact indicating trust in the trusted execution environment.

(A8) In the example computing system of any of A1-A7, wherein the property claim identifies an updated trusted execution environment that is created in the host as a result of a kernel soft reset of the host during the cold boot session, the updated trusted execution environment being an updated version of the trusted execution environment; and wherein the property claim being signed by the private portion of the signing key establishes trust in the updated trusted execution environment.

(A9) In the example computing system of any of A1-A8, wherein the property claim comprises a public portion of a second signing key that is owned by the updated trusted execution environment; and wherein the computer-executable instructions are executable by the processor system to at least: incorporate the public portion of the second signing key into the signed attestation artifact.

(A10) In the example computing system of any of A1-A9, wherein the public portion of the second signing key in the property claim is signed with the private portion of the signing key; and wherein the computer-executable instructions are executable by the processor system to at least: renew the signed attestation artifact based at least on a verification that the public portion of the second signing key in the property claim is signed with the private portion of the signing key of the trusted execution environment.

(A11) In the example computing system of any of A1-A10, wherein the computer-executable instructions are executable by the processor system to at least: renew the signed attestation artifact further based at least on the public portion of the ephemeral cryptographic key that is comprised in the request to renew the signed attestation artifact being signed by a private portion of the second signing key.

(A12) In the example computing system of any of A1-A11, wherein the attestation artifacts further comprise: an event log, which comprises a description of events that occur with regard to the host during the cold boot of the host; wherein the computer-executable instructions are executable by the processor system to validate the attestation artifacts by performing at least the following: verify that a designated portion of the event log, which is generated prior to a kernel soft reset of the host during the cold boot session, satisfies a static policy regarding static properties of the host; and wherein the static properties of the host are properties of the host that are incapable of changing during the cold boot session.

(A13) In the example computing system of any of A1-A12, wherein the computer-executable instructions are executable by the processor system to validate the attestation artifacts by performing at least the following: verify that the event log satisfies a dynamic policy regarding the dynamic properties of the host.

(A14) In the example computing system of any of A1-A13, wherein the computer-executable instructions are executable by the processor system to renew the signed attestation artifact during the cold boot session by performing at least the following: incorporate an encoded representation of the event log, which comprises the designated portion and a subsequent portion that is generated after the kernel soft reset of the host during the cold boot session, into the signed attestation artifact.

(A15) In the example computing system of any of A1-A14, wherein the key claim further indicates that the trusted execution environment runs on the host.

(A16) In the example computing system of any of A1-A15, wherein the key claim further indicates that the ephemeral cryptographic key is configured to expire at the time instance at which the cold boot session ends.

(B1) An example method is implemented by a computing system (FIG. 1, 102A-102M, 106A-106N; FIG. 4, 400; FIG. 9, 900). The method comprises, based at least on initiation of a cold boot of a host, receiving (FIG. 2, 202) attestation artifacts (FIG. 4, 430) from the host (FIG. 1, 110). At least a portion of the attestation artifacts is gathered from a trusted platform module (FIG. 1, 112) in the host. The attestation artifacts prove trust in a trusted execution environment (FIG. 1, 114) that runs on the host. A time instance at which the cold boot of the host is initiated defines a start of a cold boot session. The attestation artifacts comprise: a public portion (FIG. 4, 434) of an ephemeral cryptographic key that is generated by the trusted execution environment, a public portion (FIG. 4, 436) of a signing key that is owned by the trusted execution environment, and a key claim indicating that the ephemeral cryptographic key is generated by the trusted execution environment. The ephemeral cryptographic key is configured to expire at a time at which the cold boot session ends. The key claim is signed by a private portion of the signing key. The method further comprises validating (FIG. 2, 204) the attestation artifacts. The method further comprises, based at least on the attestation artifacts being validated, generating (FIG. 2, 206) a signed attestation artifact (FIG. 4, 442; FIG. 8, 842), which comprises the public portion of the ephemeral cryptographic key and the public portion of the signing key. The method further comprises providing (FIG. 2, 208) the signed attestation artifact, which comprises the public portion of the ephemeral cryptographic key and the public portion of the signing key, to the host. The signed attestation artifact attests to health of the host. The method further comprises receiving (FIG. 2, 210) a request (FIG. 4, 432) to renew the signed attestation artifact during the cold boot session. The request comprises the signed attestation artifact, which comprises the public portion of the ephemeral cryptographic key and the public portion of the signing key. The method further comprises, based at least on the request comprising the signed attestation artifact, which comprises the public portion of the ephemeral cryptographic key and the public portion of the signing key, and further based at least on the trusted execution environment possessing the ephemeral cryptographic key, renewing (FIG. 2, 212) the signed attestation artifact during the cold boot session.

(B2) In the example method of B1, wherein a renewed version of the signed attestation artifact is provided by renewing the signed attestation artifact during the cold boot session; and wherein the method further comprises: encrypting the renewed version of the signed attestation artifact using the public portion of the ephemeral cryptographic key.

(B3) In the example method of any of B1-B2, wherein the attestation artifacts further comprise: an event log, which comprises a description of events that occur with regard to the host during the cold boot of the host; and encoded information signed by a private portion of a second signing key that is owned by the trusted platform module, the encoded information comprising an encoded representation of results of the events that occur with regard to the host during the cold boot of the host; and wherein validating the attestation artifacts comprises: generating emulated results by performing the events based at least on the event log; generating an encoded representation of the emulated results by encoding the emulated results; comparing the encoded representation of the emulated results and the encoded information; and based at least on the encoded representation of the emulated results and the encoded information being same, validating the event log.

(B4) In the example method of any of B1-B3, wherein generating the signed attestation artifact comprises: based at least on the event log being validated, generating an attestation certificate that attests to validity of the event log; incorporating the attestation certificate into the signed attestation artifact; and incorporating an encoded representation of the event log into the signed attestation artifact.

(B5) In the example method of any of B1-B4, further comprising: providing a token to the host; and receiving a signed version of the token from the host, the signed version of the token is signed with a private portion of the ephemeral cryptographic key; wherein renewing the signed attestation artifact during the cold boot session is further based at least on the signed version of the token being signed with the private portion of the ephemeral cryptographic key.

(B6) In the example method of any of B1-B5, wherein the signed version of the token being signed with the private portion of the ephemeral cryptographic key proves that static properties of the host are unchanged during the cold boot session; and wherein the static properties of the host are properties of the host that are incapable of changing during the cold boot session.

(B7) In the example method of any of B1-B6, wherein generating the signed attestation artifact comprises: incorporating the public portion of the signing key into the signed attestation artifact; wherein the request to renew the signed attestation artifact further comprises a property claim regarding dynamic properties of the host, the property claim signed by the private portion of the signing key; wherein the dynamic properties of the host are properties of the host that are capable of changing during the cold boot session; and wherein renewing the signed attestation artifact during the cold boot session is further based at least on the request to renew the signed attestation artifact comprising the property claim signed by the private portion of the signing key and further based at least on incorporation of the public portion of the signing key into the signed attestation artifact indicating trust in the trusted execution environment.

(B8) In the example method of any of B1-B7, wherein the property claim identifies an updated trusted execution environment that is created in the host as a result of a kernel soft reset of the host during the cold boot session, the updated trusted execution environment being an updated version of the trusted execution environment; and wherein the property claim being signed by the private portion of the signing key establishes trust in the updated trusted execution environment.

(B9) In the example method of any of B1-B8, wherein the property claim comprises a public portion of a second signing key that is owned by the updated trusted execution environment; and wherein renewing the signed attestation artifact comprises: incorporating the public portion of the second signing key into the signed attestation artifact.

(B10) In the example method of any of B1-B9, wherein the public portion of the second signing key in the property claim is signed with the private portion of the signing key; and wherein renewing the signed attestation artifact is based at least on a verification that the public portion of the second signing key in the property claim is signed with the private portion of the signing key of the trusted execution environment.

(B11) In the example method of any of B1-B10, wherein renewing the signed attestation artifact is further based at least on the public portion of the ephemeral cryptographic key that is comprised in the request to renew the signed attestation artifact being signed by a private portion of the second signing key.

(B12) In the example method of any of B1-B11, wherein the attestation artifacts further comprise: an event log, which comprises a description of events that occur with regard to the host during the cold boot of the host; wherein validating the attestation artifacts comprises: verifying that a designated portion of the event log, which is generated prior to a kernel soft reset of the host during the cold boot session, satisfies a static policy regarding static properties of the host; and wherein the static properties of the host are properties of the host that are incapable of changing during the cold boot session.

(B13) In the example method of any of B1-B12, wherein validating the attestation artifacts comprises: verifying that the event log satisfies a dynamic policy regarding the dynamic properties of the host.

(B14) In the example method of any of B1-B13, wherein renewing the signed attestation artifact during the cold boot session comprises: incorporating an encoded representation of the event log, which comprises the designated portion and a subsequent portion that is generated after the kernel soft reset of the host during the cold boot session, into the signed attestation artifact.

(B15) In the example method of any of B1-B14, wherein the key claim further indicates that the trusted execution environment runs on the host.

(B16) In the example method of any of B1-B15, wherein the key claim further indicates that the ephemeral cryptographic key is configured to expire at the time instance at which the cold boot session ends.

(C1) An example computer program product (FIG. 9, 918, 922) comprising a computer-readable storage medium having instructions recorded thereon for enabling a processor-based system (FIG. 1, 102A-102M, 106A-106N; FIG. 4, 400; FIG. 9, 900) to perform operations. The operations comprise, based at least on initiation of a cold boot of a host, receiving (FIG. 2, 202) attestation artifacts (FIG. 4, 430) from the host (FIG. 1, 110). At least a portion of the attestation artifacts is gathered from a trusted platform module (FIG. 1, 112) in the host. The attestation artifacts prove trust in a trusted execution environment (FIG. 1, 114) that runs on the host. A time instance at which the cold boot of the host is initiated defines a start of a cold boot session. The attestation artifacts comprise: a public portion (FIG. 4, 434) of an ephemeral cryptographic key that is generated by the trusted execution environment, a public portion (FIG. 4, 436) of a signing key that is owned by the trusted execution environment, and a key claim indicating that the ephemeral cryptographic key is generated by the trusted execution environment. The ephemeral cryptographic key is configured to expire at a time at which the cold boot session ends. The key claim is signed by a private portion of the signing key. The operations further comprise validating (FIG. 2, 204) the attestation artifacts. The operations further comprise, based at least on the attestation artifacts being validated, generating (FIG. 2, 206) a signed attestation artifact (FIG. 4, 442; FIG. 8, 842), which comprises the public portion of the ephemeral cryptographic key and the public portion of the signing key. The operations further comprise providing (FIG. 2, 208) the signed attestation artifact, which comprises the public portion of the ephemeral cryptographic key and the public portion of the signing key, to the host. The signed attestation artifact attests to health of the host. The operations further comprise receiving (FIG. 2, 210) a request (FIG. 4, 432) to renew the signed attestation artifact during the cold boot session. The request comprises the signed attestation artifact, which comprises the public portion of the ephemeral cryptographic key and the public portion of the signing key. The operations further comprise, based at least on the request comprising the signed attestation artifact, which comprises the public portion of the ephemeral cryptographic key and the public portion of the signing key, and further based at least on the trusted execution environment possessing the ephemeral cryptographic key, renewing (FIG. 2, 212) the signed attestation artifact during the cold boot session.

III. Example Computer System

FIG. 9 depicts an example computer 900 in which embodiments may be implemented. Any one or more of the user devices 102A-102M and/or any one or more of the cloud-based computing systems 106A-106N (e.g., host 110) shown in FIG. 1 and/or the computing system 400 shown in FIG. 4 may be implemented in computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for the purpose of illustration, and is not intended to be limiting. Embodiments may be implemented in further types of computer systems, as would be known to persons skilled in the relevant art(s).

As shown in FIG. 9, computer 900 includes a processor system 902, a system memory 904, and a bus 906 that couples various system components including system memory 904 to processor system 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) the TPM usage-limiting artifact renewal logic 108, the trusted platform module 112, the trusted execution environment 114, the TPM usage-limiting artifact renewal logic 408, the artifact validation logic 422, the signed artifact generation logic 424, the signed artifact renewal logic 426, the token generation logic 428, the event performance logic 652, the encoding logic 654, the event log validation logic 656, the attestation certificate generation logic 872, the incorporation logic 874, flowchart 200 (including any step of flowchart 200), flowchart 300 (including any step of flowchart 300), flowchart 500 (including any step of flowchart 500), and/or flowchart 700 (including any step of flowchart 600), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processor system 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface 950 (e.g., a network adapter), a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. CONCLUSION

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing system comprising:
a processor system; and
a memory that stores computer-executable instructions that are executable by the processor system to at least:
based at least on initiation of a cold boot of a host, receive attestation artifacts from the host, at least a portion of the attestation artifacts gathered from a trusted platform module in the host, the attestation artifacts proving trust in a trusted execution environment that runs on the host, wherein a time instance at which the cold boot of the host is initiated defines a start of a cold boot session, the attestation artifacts comprising:
a public portion of an ephemeral cryptographic key that is generated by the trusted execution environment, the ephemeral cryptographic key configured to expire at a time at which the cold boot session ends;
a public portion of a signing key that is owned by the trusted execution environment; and
a key claim indicating that the ephemeral cryptographic key is generated by the trusted execution environment, the key claim signed by a private portion of the signing key;
validate the attestation artifacts;
based at least on the attestation artifacts being validated, generate a signed attestation artifact, which comprises the public portion of the ephemeral cryptographic key and the public portion of the signing key;
provide the signed attestation artifact, which comprises the public portion of the ephemeral cryptographic key and the public portion of the signing key, to the host, the signed attestation artifact attesting to health of the host;
receive a request to renew the signed attestation artifact during the cold boot session, the request comprising the signed attestation artifact, which comprises the public portion of the ephemeral cryptographic key and the public portion of the signing key; and
based at least on the request comprising the signed attestation artifact, which comprises the public portion of the ephemeral cryptographic key and the public portion of the signing key, and further based at least on the trusted execution environment possessing the ephemeral cryptographic key, renew the signed attestation artifact during the cold boot session.

2. The computing system of claim 1, wherein the computer-executable instructions are executable by the processor system to at least:
provide a renewed version of the signed attestation artifact by renewing the signed attestation artifact; and
encrypt the renewed version of the signed attestation artifact with the public portion of the ephemeral cryptographic key.

3. The computing system of claim 1, wherein the computer-executable instructions are executable by the processor system to at least:
provide a token to the host;
receive a signed version of the token from the host, the signed version of the token is signed with a private portion of the ephemeral cryptographic key; and
renew the signed attestation artifact during the cold boot session further based at least on the signed version of the token being signed with the private portion of the ephemeral cryptographic key.

4. The computing system of claim 3, wherein the signed version of the token being signed with the private portion of the ephemeral cryptographic key proves that static properties of the host are unchanged during the cold boot session; and
wherein the static properties of the host are properties of the host that are incapable of changing during the cold boot session.

5. The computing system of claim 1, wherein the request to renew the signed attestation artifact further comprises a property claim regarding dynamic properties of the host, the property claim signed by the private portion of the signing key,
wherein the dynamic properties of the host are properties of the host that are capable of changing during the cold boot session; and
wherein the computer-executable instructions are executable by the processor system to at least:
incorporate the public portion of the signing key into the signed attestation artifact; and
renew the signed attestation artifact during the cold boot session further based at least on the request to renew the signed attestation artifact comprising the property claim signed by the private portion of the signing key and further based at least on incorporation of the public portion of the signing key into the signed attestation artifact indicating trust in the trusted execution environment.

6. The computing system of claim 5, wherein the property claim identifies an updated trusted execution environment that is created in the host as a result of a kernel soft reset of the host during the cold boot session, the updated trusted execution environment being an updated version of the trusted execution environment; and
wherein the property claim being signed by the private portion of the signing key establishes trust in the updated trusted execution environment.

7. The computing system of claim 6, wherein the property claim comprises a public portion of a second signing key that is owned by the updated trusted execution environment; and
wherein the computer-executable instructions are executable by the processor system to at least:
incorporate the public portion of the second signing key into the signed attestation artifact.

8. The computing system of claim 7, wherein the public portion of the second signing key in the property claim is signed with the private portion of the signing key; and
wherein the computer-executable instructions are executable by the processor system to at least:
renew the signed attestation artifact based at least on a verification that the public portion of the second signing key in the property claim is signed with the private portion of the signing key of the trusted execution environment.

9. The computing system of claim 8, wherein the computer-executable instructions are executable by the processor system to at least:
renew the signed attestation artifact further based at least on the public portion of the ephemeral cryptographic key that is comprised in the request to renew the signed attestation artifact being signed by a private portion of the second signing key.

10. The computing system of claim 5, wherein the attestation artifacts further comprise:
an event log, which comprises a description of events that occur with regard to the host during the cold boot of the host;
wherein the computer-executable instructions are executable by the processor system to validate the attestation artifacts by performing at least the following:
verify that a designated portion of the event log, which is generated prior to a kernel soft reset of the host during the cold boot session, satisfies a static policy regarding static properties of the host; and
wherein the static properties of the host are properties of the host that are incapable of changing during the cold boot session.

11. The computing system of claim 10, wherein the computer-executable instructions are executable by the processor system to renew the signed attestation artifact during the cold boot session by performing at least the following:
incorporate an encoded representation of the event log, which comprises the designated portion and a subsequent portion that is generated after the kernel soft reset of the host during the cold boot session, into the signed attestation artifact.

12. A method implemented by a computing system, the method comprising:
based at least on initiation of a cold boot of a host, receiving attestation artifacts from the host, at least a portion of the attestation artifacts gathered from a trusted platform module in the host, the attestation artifacts proving trust in a trusted execution environment that runs on the host, wherein a time instance at which the cold boot of the host is initiated defines a start of a cold boot session, the attestation artifacts comprising:
a public portion of an ephemeral cryptographic key that is generated by the trusted execution environment, the ephemeral cryptographic key configured to expire at a time at which the cold boot session ends;
a public portion of a signing key that is owned by the trusted execution environment; and
a key claim indicating that the ephemeral cryptographic key is generated by the trusted execution environment, the key claim signed by a private portion of the signing key;
validating the attestation artifacts;
based at least on the attestation artifacts being validated, generating a signed attestation artifact, which comprises the public portion of the ephemeral cryptographic key and the public portion of the signing key;
providing the signed attestation artifact, which comprises the public portion of the ephemeral cryptographic key and the public portion of the signing key, to the host, the signed attestation artifact attesting to health of the host;
receiving a request to renew the signed attestation artifact during the cold boot session, the request comprising signed attestation artifact, which comprises the public portion of the ephemeral cryptographic key and the public portion of the signing key; and
based at least on the request comprising the signed attestation artifact, which comprises the public portion of the ephemeral cryptographic key and the public portion of the signing key, and further based at least on the trusted execution environment possessing the ephemeral cryptographic key, renewing the signed attestation artifact during the cold boot session.

13. The method of claim 12, wherein a renewed version of the signed attestation artifact is provided by renewing the signed attestation artifact during the cold boot session; and
wherein the method further comprises:
encrypting the renewed version of the signed attestation artifact using the public portion of the ephemeral cryptographic key.

14. The method of claim 12, wherein the attestation artifacts further comprise:
an event log, which comprises a description of events that occur with regard to the host during the cold boot of the host; and
encoded information signed by a private portion of a second signing key that is owned by the trusted platform module, the encoded information comprising an encoded representation of results of the events that occur with regard to the host during the cold boot of the host; and
wherein validating the attestation artifacts comprises:
generating emulated results by performing the events based at least on the event log;
generating an encoded representation of the emulated results by encoding the emulated results;
comparing the encoded representation of the emulated results and the encoded information; and
based at least on the encoded representation of the emulated results and the encoded information being same, validating the event log.

15. The method of claim 14, wherein generating the signed attestation artifact comprises:
based at least on the event log being validated, generating an attestation certificate that attests to validity of the event log;
incorporating the attestation certificate into the signed attestation artifact; and
incorporating an encoded representation of the event log into the signed attestation artifact.

16. The method of claim 12, further comprising:
providing a token to the host; and
receiving a signed version of the token from the host, the signed version of the token is signed with a private portion of the ephemeral cryptographic key;
wherein the signed version of the token being signed with the private portion of the ephemeral cryptographic key proves that static properties of the host are unchanged during the cold boot session;
wherein the static properties of the host are properties of the host that are incapable of changing during the cold boot session; and
wherein renewing the signed attestation artifact during the cold boot session is further based at least on the signed version of the token being signed with the private portion of the ephemeral cryptographic key.

17. The method of claim 12, wherein generating the signed attestation artifact comprises:
incorporating the public portion of the signing key into the signed attestation artifact;

wherein the request to renew the signed attestation artifact further comprises a property claim regarding dynamic properties of the host, the property claim signed by the private portion of the signing key;

wherein the dynamic properties of the host are properties of the host that are capable of changing during the cold boot session; and wherein renewing the signed attestation artifact during the cold boot session is further based at least on the request to renew the signed attestation artifact comprising the property claim signed by the private portion of the signing key and further based at least on incorporation of the public portion of the signing key into the signed attestation artifact indicating trust in the trusted execution environment.

18. The method of claim 17, wherein the attestation artifacts further comprise:

an event log, which comprises a description of events that occur with regard to the host during the cold boot of the host;

wherein validating the attestation artifacts comprises:

verifying that a designated portion of the event log, which is generated prior to a kernel soft reset of the host during the cold boot session, satisfies a static policy regarding static properties of the host; and wherein the static properties of the host are properties of the host that are incapable of changing during the cold boot session.

19. The method of claim 18, wherein validating the attestation artifacts comprises:

verifying that the event log satisfies a dynamic policy regarding the dynamic properties of the host.

20. The method of claim 12, wherein the key claim further indicates that the trusted execution environment runs on the host.

21. The method of claim 12, wherein the key claim further indicates that the ephemeral cryptographic key is configured to expire at the time instance at which the cold boot session ends.

22. A computer program product comprising a computer-readable storage medium having instructions recorded thereon for enabling a processor-based system to perform operations, the operations comprising:

based at least on initiation of a cold boot of a host, receiving attestation artifacts from the host, at least a portion of the attestation artifacts gathered from a trusted platform module in the host, the attestation artifacts proving trust in a trusted execution environment that runs on the host, wherein a time instance at which the cold boot of the host is initiated defines a start of a cold boot session, the attestation artifacts comprising:

a public portion of an ephemeral cryptographic key that is generated by the trusted execution environment, the ephemeral cryptographic key configured to expire at a time at which the cold boot session ends;

a public portion of a signing key that is owned by the trusted execution environment; and a key claim indicating that the ephemeral cryptographic key is generated by the trusted execution environment, the key claim signed by a private portion of the signing key;

validating the attestation artifacts;

based at least on the attestation artifacts being validated, generating a signed attestation artifact, which comprises the public portion of the ephemeral cryptographic key and the public portion of the signing key;

providing the signed attestation artifact, which comprises the public portion of the ephemeral cryptographic key and the public portion of the signing key, to the host, the signed attestation artifact attesting to health of the host;

receiving a request to renew the signed attestation artifact during the cold boot session, the request comprising the signed attestation artifact, which comprises the public portion of the ephemeral cryptographic key and the public portion of the signing key; and based at least on the request comprising the signed attestation artifact, which comprises the public portion of the ephemeral cryptographic key and the public portion of the signing key, and further based at least on the trusted execution environment possessing the ephemeral cryptographic key, renewing the signed attestation artifact during the cold boot session.

\* \* \* \* \*